United States Patent [19]
Rose et al.

[11] Patent Number: 4,799,173
[45] Date of Patent: Jan. 17, 1989

[54] TRANSFORMATION CIRCUIT TO EFFECT RASTER OPERATIONS

[75] Inventors: Robert C. Rose, Hudson; Ned C. Forrester, Falmouth, both of Mass.

[73] Assignee: Digital Equipment Corporation, Maynard, Mass.

[21] Appl. No.: 834,600

[22] Filed: Feb. 28, 1986

[51] Int. Cl.⁴ .............................................. G06F 3/00
[52] U.S. Cl. ................................. 364/518; 340/724; 340/727; 364/521
[58] Field of Search ................................. 364/518–521; 382/44–46; 340/700, 703, 724, 727, 729, 750, 798–800

[56] References Cited
U.S. PATENT DOCUMENTS 4,122,528 10/1978 Rieger .................................. 364/829
4,458,330 7/1984 Imsand et al. ..................... 364/521 X
4,587,558 5/1986 Sugiyama et al. ............... 364/518 X
4,653,012 3/1987 Duffy et al. ...................... 364/521 X
4,667,306 5/1987 Smith ................................... 364/900

*Primary Examiner*—Gary V. Harkcom
*Assistant Examiner*—H. R. Herndon
*Attorney, Agent, or Firm*—Michael N. Meller

[57] ABSTRACT

Circuitry to enable pixel signals, which represent information that is stored in a first section of memory (and which information defines an image, or images to be viewed on a CRT display) to be transferred to a different section of memory and in the course of the transferral be: expanded or reduced in number; and/or rotated, by arbitrary angles from the original orientation of the image; and/or have the holes, or missing pixels, which occur because of the rotation by the arbitrary angles filled in, or replaced.

16 Claims, 6 Drawing Sheets

TRANSFORMATION CIRCUIT TO EFFECT RASTER OPERATIONS

BACKGROUND OF THE INVENTION

In the video display art there are techniques referred to as rasterops which is a short hand notation for raster operations. In general the notion of rasterops is the concept of moving information, which is arranged in a pattern, from one part of memory to another part of memory while still maintaining the pattern or some version thereof. In the prior art there have been circuit means to expand or contract a pattern defined by pixel bits of information. However, such expansions and contractions have been by whole number multiples of the dimensions and not by fractional valued multiples of the dimensions. In addition, prior art rasterops circuits have provided a means to rotate (by multiples of 90 degrees) images as viewed on a video display screen. We have found that if an image is rotated by some arbitrary angle different than 90 degrees, the edge lines of such a rotated image very often resemble a step function configuration and some of the pixels needed to provide a solid image are missing. We have referred to the missing pixel signals as holes and the present system is arranged to fill in those holes. In addition, the present system permits many different transformations between the source image and destination image. For instance the present system enables the user to display a number of different font sizes while employing a single font resource.

SUMMARY OF THE INVENTION

Throughout the description there are references to fast and slow items, such as fast and slow destination addresses, fast and slow scale factors, fast and slow vectors, etc. "Fast" and "slow" are arbitrary modifiers. "Fast" refers to vectors (and related circuitry) which are drawn while performing a rasterops. "Slow" refers to vectors (and related circuitry) which define a sequence of origin points from which fast vectors are drawn.

The present circuit arrangement includes a set of circuits for generating source addresses, a set of circuits for generating fast destination addresses; a set of circuits for generating slow destination addresses, etc. The source circuitry provides a sequence of pixel addresses that defines a rectangular area in the image memory. The fast destination circuitry generates a sequence of pixel addresses that trace arbitrary lines in the image memory. The slow destination circuitry generate a sequence of pixel addresses that trace a different line in the image memory than the line traced by the pixel addresses from the fast destination circuitry. Each point along the slow vector is used as the origin position for a fast vector. The combination of the fast vectors originating along a slow vector results in a sequence of pixel addresses that define an arbitrarily oriented parallelogram in the image memory. Accordingly, the rectangular image of the source may be copied into an arbitrary destination parallelogram in the image memory. In addition, the present system includes a set of circuits which handle fast and slow scale factors which enable the source and destination images to be of different sizes.

Each of the destination circuits includes an X address circuit, a Y address circuit, a count circuit and a Bresenham Algorithm circuit. The present system is employed with circuitry which includes a timing circuit that generates 960 nanosecond time slots during a horizontal scan. Every other time slots is used for refreshing the screen. The remaining time slots are employed to read pixel information from a source address and write pixel information into a destination address in a bit map memory. The X and Y address circuits mentioned above provide the addresses into which such pixel information should be written. The count circuit determines when a vector which is being drawn is complete. When all of the pixel values of a fact vector have been written, the count circuit sends a message to the system in response to which slow vector address is incremented. The Bresenham Algorithm circuits provide control signals which tell the system to increment pixel addresses along the vectorial components of the major and minor axes or to generate a sequence of pixel addresses that trace an aribitrary line in image memory. The Bresenham Algorithm circuits are also employed to fill holes by interrupting what would be a normal two increment diagonal placement of a pixel value and instead causing a one increment address procedure with the placement of a pixel value thereat followed by a second increment address generation to the normal diagonal location. The two step procedure will cause a hole to be filled. The slow destination circuit generates a sequence of pixel addresses that trace another line in image memory. Each point in the slow vector is used as the origin for a fast vector. The foregoing results in a sequence of pixel addresses that defines an arbitrarily oriented parallelogram in the image memory. Thus, the rectangular area of the source may be transformed into an arbitrarily configured parallelogram at another location (destination) in image memory. In addition, a set of circuits for a fast and slow scale factor are employed to permit the source and transformed images to be different sizes.

The objects and features of the present invention will be better understood in view of the following description when studied in conjunction with the drawings in which.

Figure 1:
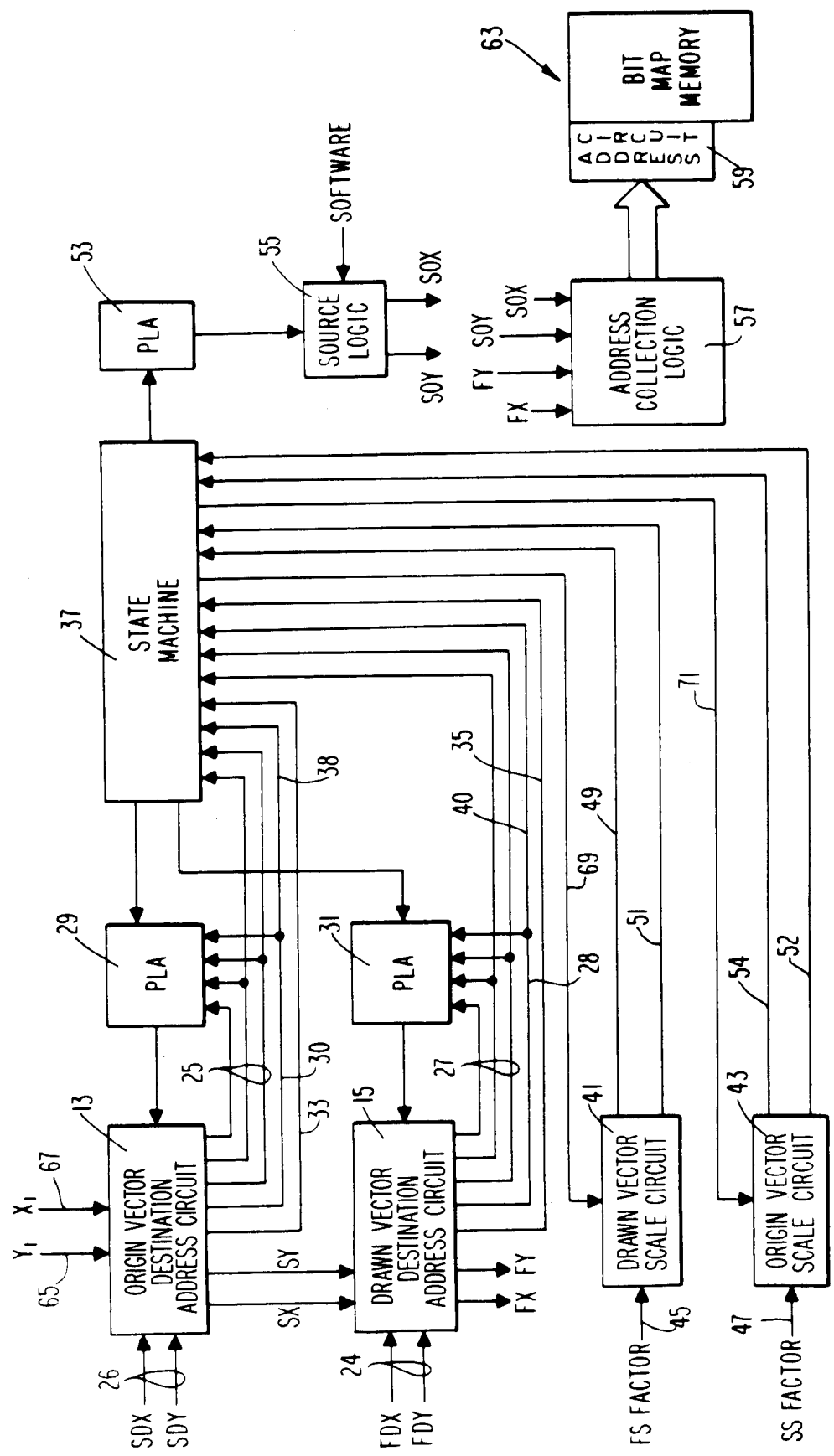
FIG. 1 is a block diagram schematic of the overall system along with a bit map memory system.

Consider FIG. 1 which is schematic block diagram of the overall system. In FIG. 1 there is shown a slow destination set of circuits 13 and a fast destination set of circuits 15. Also shown in FIG. 1 is a source logic set of circuits 55. As will become bettr understood later in this description, the source logic circuitry 55 produces pixel addresses for reading rasterop data from the source while the fast and slow destination circuits 15 and 13 produce pixel addresses for writing the data into the destination. The source and destination pixel addresses are sent to address collection circuits 57 where they are buffered, combined with refresh addresses, and multiplexed for rows and columns for presentation through circuit 59 to the bit map memory 63. It should be understood that to make the present discussion simple, we will consider that we are using a one plane memory and pixel values equal to either "1" or "0". The source addresses provide a basis for reading pixel values so that when the destination addresses are generated, the pixel values from the "addressed" source locations will be transferred internally in the bit map memory 63 to the destination addresses generated.

As will become better understood below, the user can and does choose the values used for the slow vector and the values used for the fast vectors. For each vector, there is an X entent DX and a y extent DY. The major axis is defined as the axis which has the largest extent, in other words if $|DX| > |DY|$ then X is the major axis. For purposes of this discussion, at this point, we will assume that the X axis is the major axis and the Y axis is the minor axis. The user chooses the major and minor axes by deciding the values of SDX, SDY, FDX and FDY. The user also decides how the image at the destination is going to be drawn by deciding on the arithmetic signs to be designated with DX and DY. If we look at FIG. 2 this concept becomes clearer.

Figure 2:
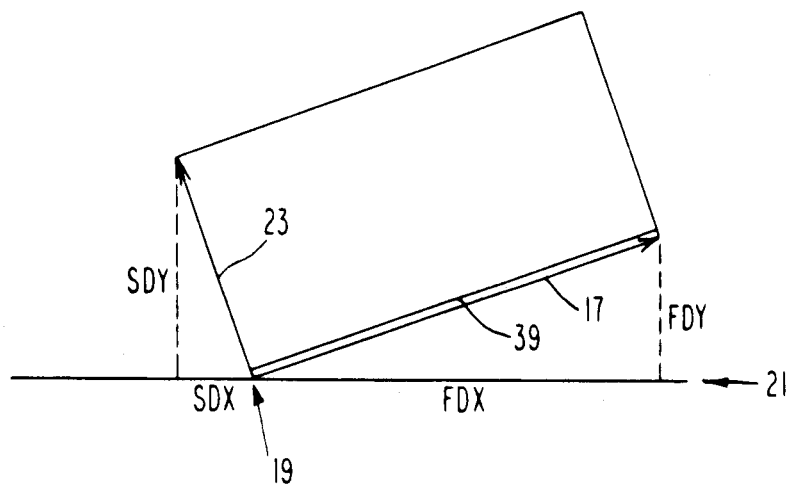
FIG. 2 depicts a parallelogram in the destination location in memory.

In FIG. 2 the vector 17 to be drawn is defined by two vectorial components FDX (fast DX) and FDY (fast DY). The user in this example has chosen vector 17 as the fast vector. If the horizontal direction to the right of point 19 is considered positive and if the vertical direction of line 21 is considered positive, then the vectorial components FDX and FDY in FIG. 2 are both positive and the user enters the FDX and FDY values as positive values into the circuitry 15 of FIG. 1. In FIG. 2, the vector 23, defined by vectorial components SDX and SDY, has been chosen as the slow vector. Since SDX is directed to the left of point 19 it has a negative value (and hence DX would have a negative arithmetic sign) while the component SDY has a positive arithmetic sign. SDX and SDY are entered into circuitry 13 of FIG. 1 with the proper arithmetic signs. As will become better understood, because of the discussion below, in the slow destination and fast destination circuitry 13 and 15, the absolute value of DX (i.e. SDX or FDX) is subtracted from the absolute value of DY (i.e. SDY or FDY) and the results thereof, together with the arithmetic values of DX and DY, indicate in which octant the respective vector lies. The relationships of DX to DY and the signs which modify them along with their designated octants can be seen in FIG. 3.

Figure 3:
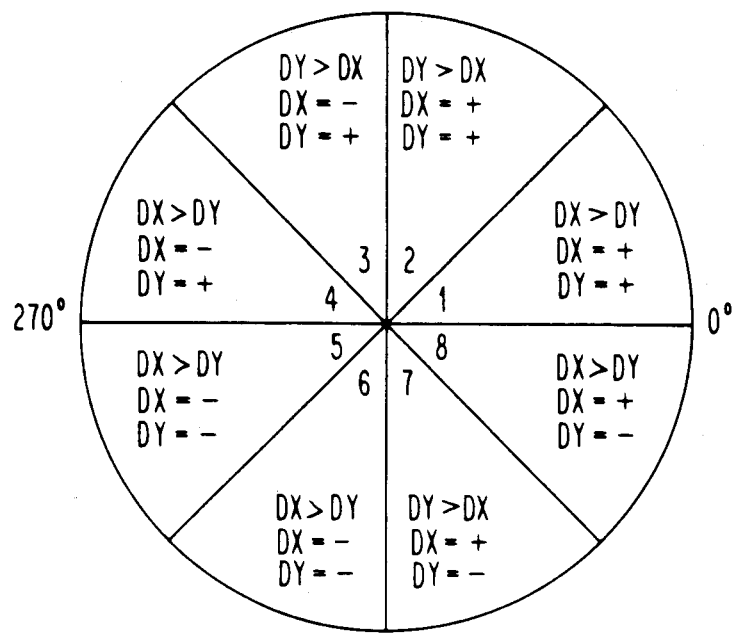
FIG. 3 shows the octants in which a vector can be drawn and the DX and DY conditions associated with each octant.

As can be gleaned from an examination of FIG. 3, if three parameters are known, then the octant position of the vector is known. If the arithmetic sign of DX, the arithmetic sign of DY and the larger of DX or DY is known, then the system knows in which octant the vector lies. As was mentioned above, the user (the program) provides the arithmetic signs and magnitudes of DX and DY. Signals representing those three parameters are transmitted on lines 25 and 27 respectively to PLA 29 and PLA 31. The PLAs 29 and 31 are programmed logic arrays which serve to control switching circuits in, respectively, the slow destination circuitry 13 and the fast destination circuitry 15. In a preferred embodiment the PLAs are part no. 82S100 manufactured by Signetics Corporation.

It can also be seen in FIG. 1 that there is a line 33 from the slow destination circuitry 13 to the state machine 37 and a line 35 from the fast destination circuitry 15 to the state machine 37. When a vector is being drawn, such as vector 17 in FIG. 2, the fast destination circuitry will count each time the X address is incremented. When the count reaches the value FDX, a signal indicating that vector 17 has been completely drawn will be sent on line 35 to the state machine 37. The state machine 37 in turn will send a signal to both PLAs 29 and 31. In response to this last mentioned signal from state machine 37, PLA 29 will set the switches in slow destination circuitry 13 to increment the address values along the $-DX$ and $+DY$ vectorial components of vector 23. In addition, the PLA 31 will initialize the fast destination circuitry 15 to provide a starting address on slow vector 23. By incrementing the component addresses of slow vector 23 and initializing the X and Y addresses to start at the incremented addresses of slow vector 23, a second vector 39 is started and ultimately drawn. The state machine 37 in a preferred embodiment is part no. 82S100 manufactured by Signetics Corporation.

As can be further seen in FIG. 1, there is a fast scale circuit 41 and slow scale circuit 43. The details of those circuits will be discussed at a later point. Note that the input to fast scale circuit 41 is a fast scale (FS) factor on line 45 and the input to slow scale circuit 43 is a slow scale (SS) factor on line 47. The scale factors and the scale circuitry enable the present system to expand or reduce the size of an image by fractional valued multiples or by whole number multiples. Expanding the source image, or upscaling, is accomplished by copying one pixel value from the source into multiple pixel locations at the destination. Down scaling is accomplished by transforming multiple pixel values from the source into one pixel value at the destination.

For instance, for upscaling, in the fast scale circuit 41 the scale factor FS (which is always less than 1) is accumulated each time a fast vector pixel address is generated. The fast scale circuit 41 is designed to send a signal on line 49 which indicates to the state machine 37 that the address of the first vector being drawn should be incremented. The state machine 37 sends a control signal to PLA 31 which in turn causes destination circuitry 15 to increment the address of the fast vector being drawn. When the sum of the scale factors exceeds 1, then fast scale circuitry 41 sends a signal on line 51 which causes the state machine 37 to send a signal to PLA 53. PLA 53 in response sends a signal to the source logic circuit 55. The source logic circuit 55 causes the source address to be incremented. As mentioned above, in expanding an image, the system must copy the pixel values of one source address into multiple destination addresses. In reducing an image the system must read a number of pixel values from the source image before it produces a pixel value at a single destination address. By way of example, if an image in the source had a vector four units long and the program called for expanding it by a factor of 2.5, then the resulting vector would be ten units long. The system handles that assignment by producing 3 pixel values in the expanded image from the first pixel value in the source; 2 more pixel values in the expanded image from the second source pixel value; 3 more pixel values in the expanded image from the third source pixel value; and 2 more pixel values in the expanded image from the last source pixel value. Hence there would be 10 pixel values in the expanded image for the 4 pixel values in the source. As will be better understood hereinafter the fast scale circuit 41 and the slow scale circuit 43 are designed to accomplish the foregoing averaging of pixel value generation in the expanded image. It should be understood that the address collection logic 57 and the bit map memory 63 do not represent circuitry which is part of the present invention but are shown as one example of a utility means for using the signals generated by the present invention.

In FIG. 1 there are shown two input lines 65 and 67 connected to the slow destination circuit 13. The value $X_1$ on line 67 is the X address for the starting point, in the destination section of memory, of the transformed image. The value $Y_1$ on line 65 is the Y address in the destination section of memory for the starting point of the transformed image. As will become understood when we study the details of the destination circuits 13 and 15, the X and Y values during an initialization procedure are transferred from circuit 13 to circuit 15. Accordingly, it should be understood that after an initialization and the system has begun to transform an image, the starting point for each fast vector is the address of the last generated pixel value of the slow vector. Note that the addresses FX and FY sent to the bit map memory come only from the fast destination circuit 15. It follows that the transformed image is expanded by changing the FX and FY values. The slow vector is advanced and therefore drawn by changing the initialization address in response to a control signal from the state machine 37. The fast scale circuit 41 and the slow scale circuit 43 receive control signals (on lines 69 and 71) from state machine 37 to initialize those circuits. It should be borne in mind that the state machine 37 and the PLAs 29 and 31 are programmable devices and are programmed to accomplish the steps set out in this description.

Consider now FIGS. 4, 5, 6 and 7 as well as FIGS. 8, 9, 10, and 11. FIGS. 4, 5, 6 and 7 represent a set of circuits found in the fast destination circuitry 15. FIGS. 8, 9, 10 and 11 represent a set of circuits found in slow destination circuitry 13. Examine first FIG. 11 which in the circuit that produces the SX address, bearing in mind that the SX address becomes the input to line 7-3 of FIG. 7. First it should be understood that the circuits shown in FIGS. 4 through 11 are shown in logic form, i.e. as switches, as add—subtract devices, as accumulators, as registers and the like. Actually the circuits of FIGS. 4 through 11 are made up of a plurality of integrated circuit chips in which the switching is accomplished electronically. In a preferred embodiment the switches, (such as switches 11-3 and 11-1 of FIG. 11), for all of the circuits of FIGS. 4 though 13 as well as the switches of circuit 55 of FIG. 1 are multiplexers and are part number 74153 manufactured by Texas Instruments Corporation. It should be understood that other types of switching means could be employed and other forms of multiplexers could be used. In a preferred embodiment the add-subtract devices (such as A-S device 11-5), for all of the circuits of FIGS. 4 through 13 as well as the A-S device in circuit 55 of FIG. 1, are part number 74181 manufactured by Texas Instruments Corporation. In a preferred embodiment, the accumulators, (such as accumulator 11-6), for all the circuits of FIGS. 4 though 13, as well as the accumulator in circuit 55 of FIG. 1 are part number 7491 manufactured by Texas Instruments Corporation. It should be understood that other types of add-subtract devices as well as other types of accumulators could be used. The registers, such as register 8-13, are part number 7474 manufactured by Texas Instruments Corporation.

Figure 10:
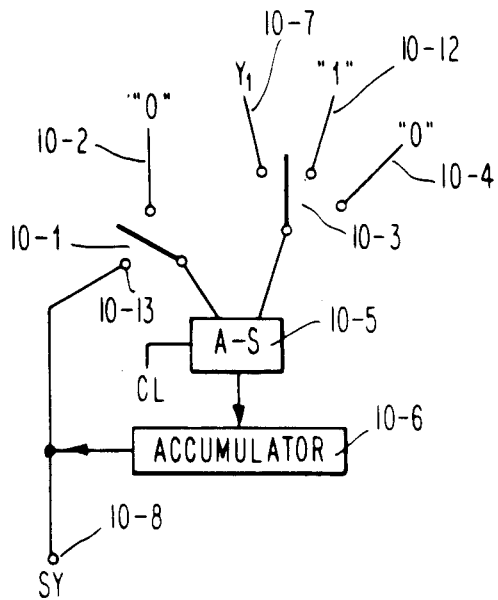
FIG. 10 is a logic circuit which generates slow y axis addresses.
Figure 11:
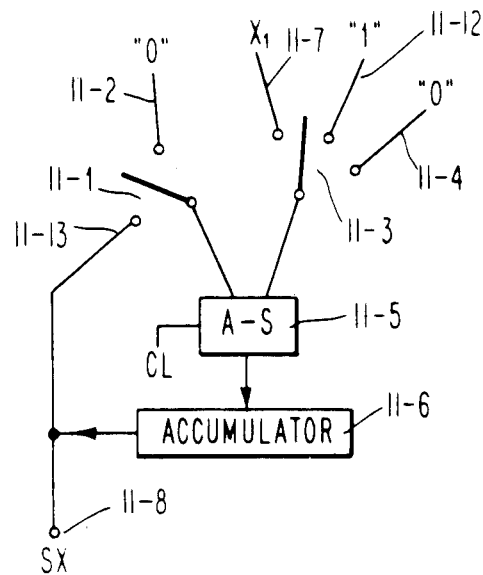
FIG. 11 is a logic circuit which generates slow x axis addresses.
Figure 12:
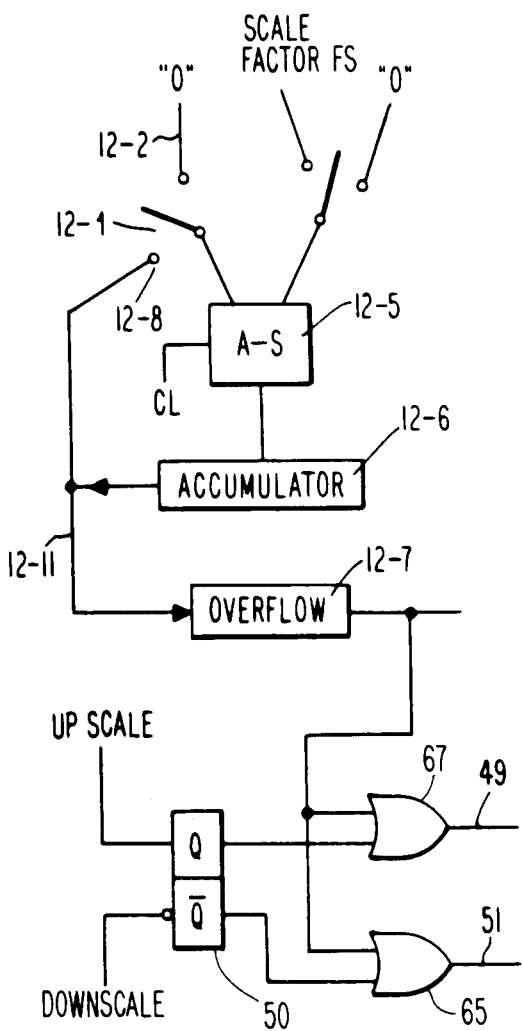
FIG. 12 is a logic circuit which generates control signals which are used to scale an image along its fast vector component axes.

If we again examine FIG. 11, it should be understood that during initialization, PLA 29 (in response to signals from state machine 37) sets the switch 11-1 to the "0" position 11-2. In addition, the switch 11-3 is set to the "0" position 11-4. Accordingly, zero is added to zero in the add-subtract device 11-5 and the sum of zero is placed in the accumulator 11-6. It follows that the SX address circuit of FIG. 11 is initially reset to zero. The circuits of FIGS. 4 through 10 are operated for reset in a similar manner and thus all of those circuits are reset to zero. In the next step during initialization, PLA 29 sets switch 11-3 to the $X_1$ input line 11-7. The switch 11-1 remains in the "0" position, i.e., connected to line 11-2. During the proper clock time the $X_1$ address is added to zero in the add-subtract device 11-5 and the sum (i.e. $X_1$) is transferred to accumulator 11-6. The value in the accumulator 11-6 is present on terminal 11-8 as the SX address, which is output to the fast destination circuitry 15.

The operation of the circuitry of FIG. 10 is identical to that of the circuitry of FIG. 11 except that the input is the $Y_1$ address of the starting point of the image to be transferred as found on line 10-7. No further description of the operation of the circuitry of FIG. 10 is deemed necessary.

Figure 6:
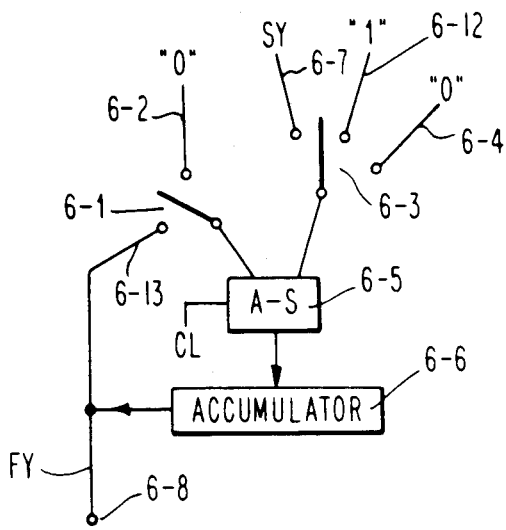
FIG. 6 is a logic circuit which generates fast y axis addresses.
Figure 7:
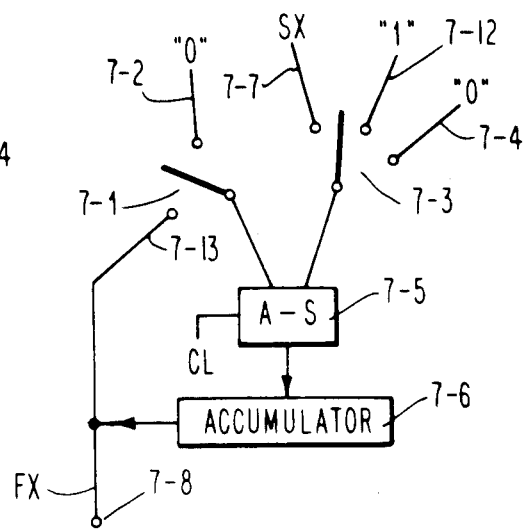
FIG. 7 is a logic circuit which generates fast x axis addresses.

Examine FIGS. 6 and 7. The circuits of FIGS. 6 and 7 accept the respective input signals of SY and SX, which represent the starting address for a corresponding fast vector to be drawn, from the circuits of FIGS. 10 and 11. The address values SY and SX are respectively added to zero, as described in the discussion of the circuit of FIG. 11. Hence the address values of FY and FX are respectively equal to SY and SX which are in turn respectively equal to $Y_1$ and $X_1$. Since both the fast and slow vectors start at the same X-Y address when being transferred to the bit map memory (i.e., the starting point chosen by the user), it follows that initially $X_1 = SX = FX$ and $Y_1 = SY = FY$.

If we assume, by way of example, that the image to be moved has a rectangular boundary (defined along the X and Y directions), that there is to be no rotation and that the fast vectors will extend in the X direction, then we only need discuss FIGS. 7 and 10. The foregoing is true because the fast vector would have no Y component. Under such circumstances, PLA 31 sets the switch 7-3 (FIG. 7) to the "1" input line 7-12 and sets the switch 7-1 to the accumulator input line 7-13. Each time there is an output signal on line 49, PLA 31 clocks the A-S device 7-5. With the switches 7-3 and 7-1 so set, the sum in the accumulator 7-6 (i.e., FX, which initially is the last SX address) is added to unity and thus there is a new address for a new pixel value to be computed for the fast vector being drawn. Meantime during each read and write time slot, the FY value remains constant. The foregoing is true because PLA 31 has set switch 6-1 to the accumulator input line 6-13 and set the switch 6-3 to the "0" input line 6-4. With such switch settings, zero is added to the original Y value from the accumulator and FY remains constant. During the drawing of the first fast vector on the video display both switches 10-3 and 11-3 are set (in response to signals from PLA 29) to the zero position, i.e., respectively to lines 10-4 and 11-4, and the switches 10-1 and 11-1 are set respectively to their accumulator input lines 10-13 and 11-13. Therefore, the SY address and the SX address are the starting $Y_1$ and $X_1$ addresses.

Figure 5:
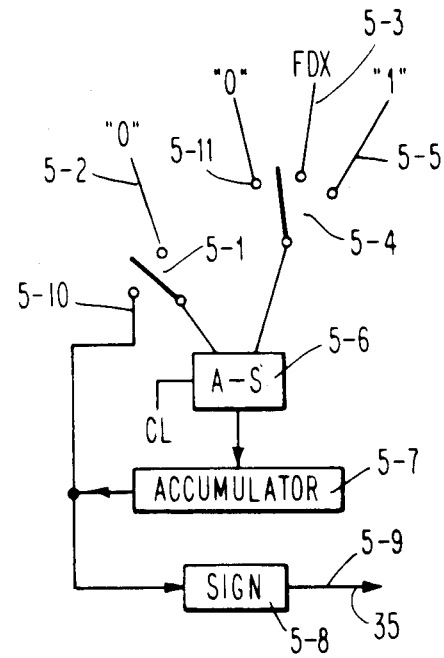
FIG. 5 is a logic circuit which counts the pixel addresses which are incremented to determine when a fast vector has been completely drawn.

As pixel addresses are computed for the fast vector, the addresses are counted in the count circuit of FIG. 5. It will be recalled that the count circuit of FIG. 5 was reset to zero. Thereafter, during further initialization, the switch 5-4 is set to line 5-3 to receive the FDX value, while the switch 5-1 is set to line 5-2 to receive the zero reset value. It should be remembered that FDX is provided by the user. However, when FDX is passed to A-S device 5-6, it is subtracted from zero and hence the sum $-DX$ is stored in accumulator 5-7. The arithmetic sign of the sum is directed to the register 5-8. When pixel addresses are being computed for the fast vector, the switch 5-4 is set (by PLA 31) to the "1" terminal 5-5. At the same time switch 5-1 is set to the accumulator input line 5-10. At the time that the first pixel address is computed, $-DX$ from the accumulator is added (in the add-subtract device 5-6) to $+1$, which makes the negative number become less negative. As long as the arithmetic sign of the accumulator contents stays negative it provides a negative arithmetic sign value in the register 5-8. As "1"s are added to DX, the accumulator contents become less negative and will eventually reach zero. The value of zero is sensed as a sign change in register 5-8. An arithmetic sign change in register 5-8 generates a signal at terminal 5-9 and that signal is present on line 35 of FIG. 1.

When a count signal is transmitted on line 35 of FIG. 1, it is transmitted to the state machine 37. State machine 37, in response, sends signals to both PLA 29 and PLA 31 as described earlier. In response to the signal from PLA and assuming that the ground rules of FIG. 3 are in effect (i.e. the positive Y direction is up), "1" will be added to the $Y_1$ address in FIG. 10 and the second fast vector will start at a position above the first fast vector.

Under such circumstances PLA 29 sets the switch 10-1 to the accumulator input line 10-13 and sets the switch 10-3 to the "1" input line 10-12. The PLA signal clocks the "1" to be added to the initial address (i.e., $Y_1$), so that the second fast vector is started from a new address $Y_1+1$. SX remains equal to $X_1$ since in our example we are transforming a rectangular image without rotation. At the same time the circuitry of FIG. 9 will count the Y address increments. Each time a pixel address is computed to further define the slow vector, the count circuit of FIG. 9 increases its $-DY$ value by $+1$. The accumulator 9-7 is loaded with a $-DY$ value in the same way that accumlator 5-7 of FIG. 5 was loaded with a $-DX$ value. When the $-DY$ value is reduced to zero in the accumulator 9-7, an arithmetic sign change is detected and a predetermined signal is generated on terminal 9-9. That signal is transmitted on line 33 of FIG. 1. When the end of the slow vector is reached, then only one more fast vector is needed to complete the transformation of the source image, and that message is sent by the signal on line 33.

Figure 13:
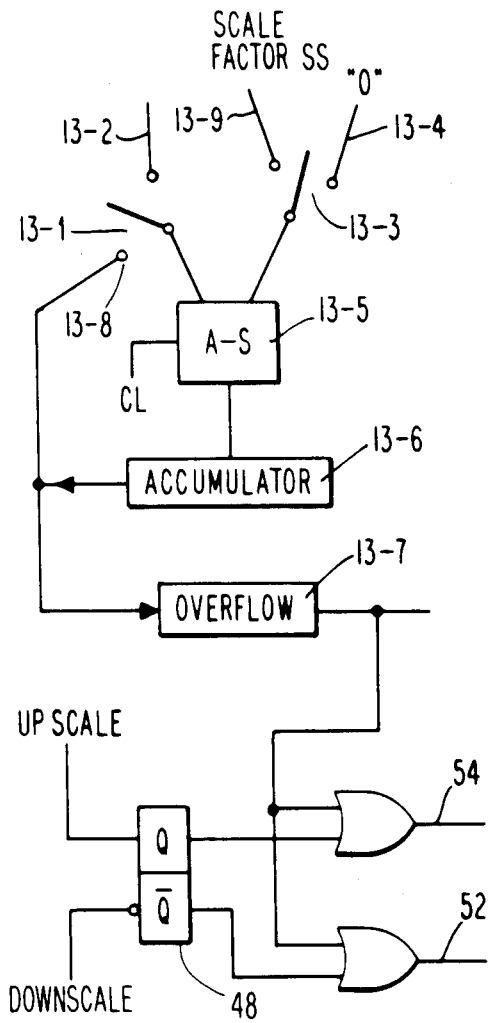
FIG. 13 is a logic circuit which generates control signals which are used to scale an image along its slow vector component axes.

Note from FIG. 1 that when the SDX and SDY addresses are generated from the source logic 55, they are transmitted to the address collection logic 57 as mentioned earlier. The addresses SDX and SDY are not incremented until the scale circuits generate signals on lines 51 and 52. The generation of those signals can be better understood by studying the functions of the circuits of FIGS. 12 and 13. When an image is going to be moved from the source section of memory to a new location and expanded, the image is expanded by some factor. The circuits of FIGS. 12 and 13 enable the present system to handle expansions or contractions of a fractional multiple of the image size. By way of example, consider the expansion of a rectangular image from the source which has 10 pixels in the X direction and 4 pixels in the Y direction. Obviously, an actual image would be many times larger than the foregoing dimensions because there are some ten lines of pixels per line of visible text. Be that as it may, let us assume that the image of 4 pixels by 10 pixels is to be expanded by a factor of 2.4 in the X. Under such circumstances, the scale circuit of FIG. 12 (which is the fast scale factor circuit) employs a fast scale factor FS of 1/2.4 or 0.417, while the scale circuit of FIG. 13 employs a slow scale factor SS of 1/3.2 or 0.312. Bearing the scale factors in mind, let us examine the operation of the fast scale circuitry of FIG. 12. During initialization the state machine 37 transmits signals on line 69 to set switch 12-1 to the "0" input line 12-2. In addition, the switch 12-3 is set to the "0" input line 12-4. Therefore, a zero value is added to a zero value to provide a sum of zero in the accumulator 12-6 and thus reset the scale circuit 41 to zero. The scale circuit 43 of FIG. 13 is reset to zero in the same way. After initialization, switch 12-3 is set to the fast scale factor FS line 12-9. A signal value of 0.417 is transmitted from line 12-9 to the add-subtract device 12-5. At the same time, switch 12-1 is set to the accumulator input line 12-8. In response to a clock signal at the A-S device 12-5, the value of 0.417 is added to zero and stored in the accumulator. Coincident with the addition of the factor 0.417, a pixel address is computed for the fast vector, in response to a signal on line 49 and a clock signal in state machine 37. The signal on line 49 is generated for the entire time if the system is upscaling. Flip flop 50 is transferred to it set side, or Q side, if the system is operating in an upscaling mode. The overflow signal will pass through the OR gate 65 to provide an increment control signal on line 51. The overflow signal is output in response to the contents of accumulator 12-6 exceeding a whole number. If the system is doing a down scale, then flip flop 50 is transferred to the $\overline{Q}$ side and then there is a constant increment control signal on line 51. Bear in mind that the fast vector will be completed before the system increments the slow vector address.

During the next clock time the value of 0.417 from the accumulator 12-6 is added to 0.417 from the fast scale factor FS line 12-9 and the value of 0.834 is stored in the accumulator. Meantime a second pixel address has been computed for the fast vector. During the next clock time value of 0.834 from the accumulator 12-6 is added to 0.417 from the fast scale factor FS line 12-9 and hence the accumulator should have the sum 1.251 stored therein. But the accumulator 12-6 is designed to treat the value of "1" as a carry and thus provide a signal on line 12-11. The carry signal on line 12-11 causes the overflow circuit 12-7 to provide a signal on line 51 through the OR gate 65. It follows then that the source address SDX is incremented by "1" and there is a value of 0.251 remaining in the accumulator. If we review the operation just described it will become apparent that for the first pixel address in the section of memory three pixel addresses have been computed for the fast vector. The following table will provide insight into the relationship between the pixel values in the source vector and the pixel values in the fast vector. It should be recognized that the user knows that DX of the destination image will be 24 pixels because he is expanding the 10 pixels in the X direction of the source image by a factor of 2.4.

pixels corresponding to the rotated vector, some pixels are located diagonally from the previously generated pixels and some pixels are located along the major axis from the previously generated pixels. If the address of a pixel value locates that pixel value at a position to the location of the last pixel value, then both the major axis and minor axis addresses are incremented. If the address of a pixel value should locate that pixel value at a pixel position along the major axis displaced from the last pixel value, then only the major axis address is incemented. Bresenham's Algorithm provides a basis for making the determination whether both the major and minor axes addresses or only the major axis address should be incremented. The foregoing will be better understood if we consider an example.

Figure 14:
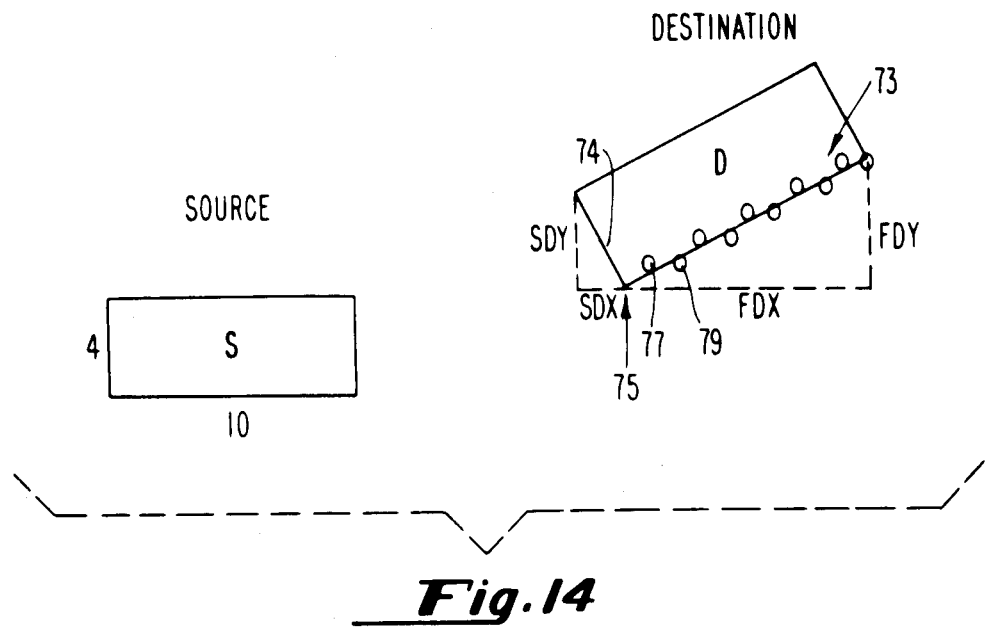
FIG. 14 depicts both a source image which has been rotated and the effect of Bresenham's Algorithm.

Consider FIG. 14. In FIG. 14 there is shown an image S (for source) located in the source portion of the memory and an image D (for destination) located in the

TABLE I

| TIME FRAME | SCALE FACTOR ADDED | TOTAL IN ACCUMULATOR | CARRY | POSITION OF SOURCE PIXEL | TOTAL PIXELS ADDED |
|---|---|---|---|---|---|
| 1 | .417 | .417 | NO | FIRST | 1 |
| 2 | .417 | .834 | NO | FIRST | 2 |
| 3 | .417 | 1.251 | YES | FIRST | 3 |
| 4 | .417 | .668 | NO | SECOND | 4 |
| 5 | .417 | 1.085 | YES | SECOND | 5 |
| 6 | .417 | .502 | NO | THIRD | 6 |
| 7 | .417 | .919 | NO | THIRD | 7 |
| 8 | .417 | 1.336 | YES | THIRD | 8 |
| 9 | .417 | .753 | NO | FOURTH | 9 |
| 10 | .417 | 1.170 | YES | FOURTH | 10 |
| 11 | .417 | .587 | NO | FIFTH | 11 |
| 12 | .417 | 1.004 | YES | FIFTH | 12 |
| 13 | .417 | .421 | NO | SIXTH | 13 |
| 14 | .417 | .838 | NO | SIXTH | 14 |
| 15 | .417 | 1.255 | YES | SIXTH | 15 |
| 16 | .417 | .672 | NO | SEVENTH | 16 |
| 17 | .417 | 1.089 | YES | SEVENTH | 17 |
| 18 | .417 | .506 | NO | EIGHTH | 18 |
| 19 | .417 | .923 | NO | EIGHTH | 19 |
| 20 | .417 | 1.340 | YES | EIGHTH | 20 |
| 21 | .417 | .757 | NO | NINTH | 21 |
| 22 | .417 | 1.174 | YES | NINTH | 22 |
| 23 | .417 | .591 | NO | TENTH | 23 |
| 24 | .417 | 1.008 | YES | TENTH | 24 |

From Table I it can be gleaned that for the first, third, sixth and eighth source pixel addresses there were three fast vector pixel addresses computed and for each of the other source pixel addresses only two fast vector pixel addresses were computed. Each of the 13 vectors would follow the same pattern in the X direction. However, the pattern in the Y direction would differ due to the different scale factor. The circuitry of FIG. 13 operates in the same fashion as the circuitry of FIG. 12 except that switch 13-3 is only set to the slow scale factor SS line 13-9 in response to a count signal on line 35 of FIG. 1. At the outset of the discussion about Bresenham's Algorithm, it should be understood that Bresenham's Algorithm per se is not part of the present invention.

Figure 4:
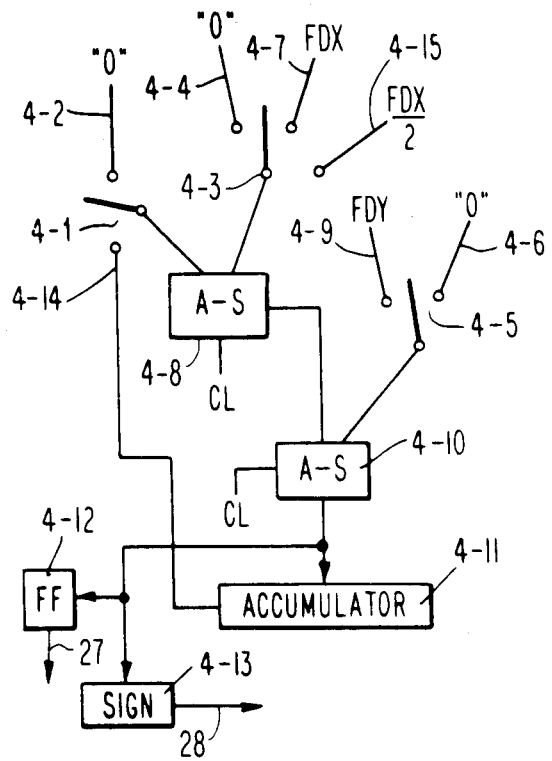
FIG. 4 is a logic circuit which implements Bresenham's Algorithm for use in generating fast destination addresses.
Figure 8:
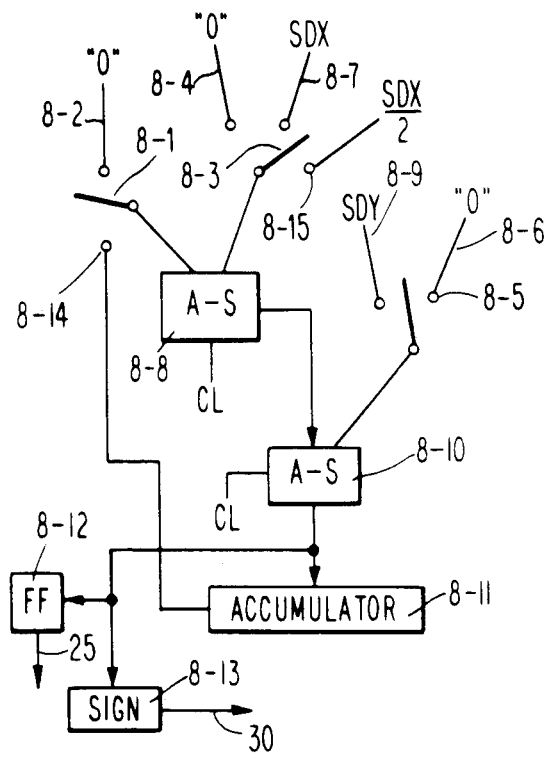
FIG. 8 is a logic circuit which implements Bresenham's Algorithm for use in generating slow destination addresses.
Figure 9:
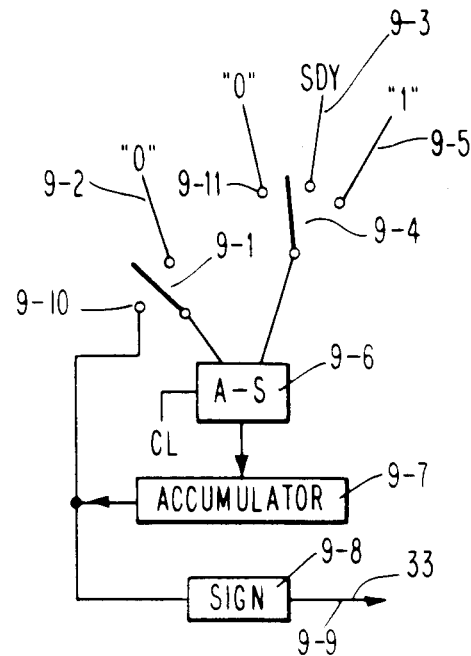
FIG. 9 is a logic circuit which counts the pixel addresses which are incremented to determine when the last pixel of the slow vector has been reached.

The Bresenham Algorithm circuit of the fast destination set of circuits is shown in FIG. 4. The Bresenham circuitry of FIG. 4 enables the image to be rotated. However, before the circuits of FIGS. 4 and 8 are discussed we should consider the significance of Bresenham's Algorithm in so far as this invention is concerned. Bresenham's Algorithm provides a technique, or a routine, by which an arbitrary vector can be approximated on a rectangular grid of pixels. In order to select those destination portion of the memory. The image D has been rotated. The user decides to what angle the destination image should be roated and chooses FDY and SDX to effect the proper angular rotation. In our example the image has been rotated 30° hence FDY has a value of 5 units and SDX has a value of 2 units. We will assume that each unit is a pixel size to simplify the illustration, but actually such an image could be many times greater. We have found that if we change Bresenham's Algorithm slightly so that we divide the end strokes along the major axis, there results a better average of the pixel values along the intended diagonal line as it appears to the viewer. The following TABLE II will set out the Bresenham routine and the manner in which it is applied through both the fast destination circuitry 15 and the slow destination circuitry 13. According to Bresenham's Algorithm, in order to generate addresses for a vector, the absolute value of the vectorial component along the major axis is subtracted from the absolute value of the vectorial component along the minor axis. If the difference is negative, only the major axis address is incremented whereas if the difference is positive, both the major axis address and the minor axis address are incremented. Further, if the difference is negative, then in the following step the difference value is added to the absolute value of the component along the minor axis. Bearing in mind those ground rules, examine TABLE II.

in the accumulator 8-11 is negative, then DX is the component along the major axis and if the difference in the accumulator 8-11 is positive, then DY is the component along the major axis. The arithmetic sign bit from

TABLE II

| STEP | BRESENHAM'S ALGORITHM | NUMERIC CALCULATION | ACCUMULATOR CONTENTS | SIGN INTERPRETATION | |
|---|---|---|---|---|---|
| | | | | INCREMENT FX ADDRESS | INCREMENT FY ADDRESS |
| 1 | ACC − \|FDX/2\| + \|FDY\| | 0 − 5 + 5 = | 0 | Y | Y |
| 2 | ACC − \|FDX\| + \|FDY\| | 0 − 10 + 5 = | −5 | Y | N |
| 3 | ACC + \|FDY\| | −5 + 5 = | 0 | Y | Y |
| 4 | ACC − \|FDX\| + \|FDY\| | 0 − 10 + 5 = | −5 | Y | N |
| 5 | ACC + \|FDY\| | −5 + 5 = | 0 | Y | Y |
| 6 | ACC − \|FDX\| + \|FDY\| | 0 − 10 + 5 = | −5 | Y | N |
| 7 | ACC + \|FDY\| | −5 + 5 = | 0 | Y | Y |
| 8 | ACC − \|FDX\| + \|FDY\| | 0 − 10 + 5 = | −5 | Y | N |
| 9 | ACC + \|FDY\| | −5 + 5 = | 0 | Y | Y |
| 10 | ACC − \|FDX\| + \|FDY\| | 0 − 10 + 5 = | −5 | Y | N |

If we examine TABLE II it can be seen that each time the accumulator has a difference of zero (or there had been a plus answer), both the X and Y addresses of the vector being drawn were incremented and each time the accumulator had a negative valve therein, only the X address was incremented. In FIG. 14 the pixels are shown in the locations directed by TABLE II. The pixels in FIG. 14 are drawn smaller than their actual size as related to the drawing (since we assumed that the image size was 10 pixels by 4 pixels) in order to make the drawing more meaningful. The starting point of vector 73 is the point 75. Note that step 1 of TABLE II says that both the X and Y addresses should be incremented and hence pixel 77 is located one pixel position to the right and one pixel position above. Note that step 2 of TABLE II says that only the X address should be incremented. Accordingly, pixel 79 is located one pixel position to the right. By following the arithmetic sign interpretation of TABLE II, it can be seen that the pixels in FIG. 14 are grouped along the desired position of the vector 73 to be drawn and the viewer sees those pixels as a line approximating the vector 73.

Consider now the operation of the Bresenham Algorithm circuitry shown in FIGS. 4 and 8. The system must first decide what the major and minor axes are for the fast and slow vectors and in what octant the vectors are going to be located. The user known where the transformed image is to be drawn and, in accordance with the octant relationship shown in FIG. 3, provides signs for the component axes. The user also knows how much the image is to be rotated and therefore the user determines the values of FDX, FDY, SDX and SDY. While it would be a simple matter for the user to provide the information as to which axis would be the major axis, the system uses the Bresenham Algorithm circuit to make that determination.

Consider FIG. 8 which is the Bresenham Algorithm circuit found in the slow destination circuit 13. During initialization switch 8-1 is set to the "0⇌ line 8-2, switch 8-3 is set to the "0" line 8-4, and switch 8-5 is set to the "0" line 8-6. Hence all of the zeros are added together and the Bresenham Algorithm circuit of FIG. 8 is reset to zero. Thereafter during initialization switch 8-3 is set to line 8-7 while switch 8-1 remains set at the "0" input line 8-2. Thus, the SDX value is added to zero in the add-subtract device 8-8. At the same time switch 8-5 is set to the SDY line 8-9 and SDX is transferred from the A-S device 8-8 to be subtracted from SDY in the A-S device 8-10. The difference computed in A-S device 8-10 is stored in the accumulator 8-11. If the difference in the accumulator 8-11 is negative, then DX is the component along the major axis and if the difference in the accumulator 8-11 is positive, then DY is the component along the major axis. The arithmetic sign bit from the difference is stored in the flip-flop 8-12, and that signal is one of the three signals sent on lines 25 to PLA 29. The two other signals on lines 25, which indicate the sign values of SDX and SDY, are stored in two flip flops (not shown) which receive their arithmetic sign input directly from the input signals on lines 26 in FIG. 1. The circuitry of FIG. 4 is initialized in the same fashion as the circuitry of FIG. 8 and no further discussion of initializing the circuitry of FIG. 4 is deemed necessary.

Consider now the operation of the circuitry of FIG. 4 to provide the results shown in TABLE II. During the initialization, as just described, the system has determined that, with respect to the fast vector 73 (FIG. 14), X is the major axis and Y is the minor axis. Prior to the first time slot for reading from the source and writing into the destination location of memory, the starting addresses FX and FY will be generated as described earlier with respect to the circuits of FIGS. 6 and 7. During the first time slot for reading from the source and writing into the destination: switch 4-1 will be set to the accumulator input line 4-14; switch 4-3 will be set to the FDX/2 input line 4-14; and the switch 4-5 will be set to the FDY input line 4-9. Since there is a zero in the accumulator from the reset procedure, described above FDX/2 gets subtracted from zero in the A-S device 4-8, which results in a difference signal of −DX/2. The signal from Pla 31 directs the A-S device 4-8 to subtract. The value of −DX/2 is then directed to A-S device 4-10, where the absolute value of FDX/2 is subtracted from the absolute value of FDY (i.e. (FDY)-(FDX/2)). From the numerical values of TABLE II we find that the calculations in the two A-S devices 4-8 and 4-10 result in 0−5+5=0. Hence there is a zero in accumulator 4-11. A zero is interpreted as an arithmetic plus sign and the arithmetic plus sign is stored in register 4-13. Register 4-13 in a preferred embodiment is a 74S74 manufactured by Texas Instruments Corporation. The arithmetic sign signal from register 4-13 is transmitted on line 28 to PLA 31. PLA 31 responds to the plus sign signal to set the switches 7-3 and 6-3 to their respective "1" input lines and hence both the FX and FY addresses are incremented as indicated in the last two columns of TABLE II. Accordingly pixel 77 of FIG. 14 is located as shown. During the next time slot wherein the source is read and the destination is written into, PLA 31 will set switch 4-3 at its FDX input on line 4-7 while switch 4-1 remains set at line 4-14 and switch 4-5 remains set at FDY input line 4-9. In accordance with the settings of the switches and the last time slot operation, the accumulator 4-11 provides a zero to the A-S device 4-8, while line 4-7 provides FDX to the A-S device 4-8 and the control signal from PLA 31 causes the absolute value of FDX to be subtracted from zero. Hence the −FDX value is transferred to the A-S device 4-10 whereat the absolute value of FDX is subtracted from the absolute value of FDY. From the numerical values of TABLE II we find that the calculations in the two A-S devices 4-8 and 4-10 result in 0−10+5=5. Hence there is a −5 value in accumulator 4-11. The arithmetic negative sign is stored in register 4-13 and transmitted to PLA 31. PLA 31 responds to the arithmetic negative sign to set switch 6-3 at the "0" input line 6-4 while switch 7-3 remains set at the "1" input line 7-12. Accordingly only the FX address is incremented as indicated in the last two columns of TABLE II. It follows that pixel 79 of FIG. 14 is located as shown. The system continues the operation of generating signals for PLA 31, which in turn directs the circuitry of FIGS. 6 and 7 to generate the proper FX and FY signals. The Bresenham Algorithm circuitry of FIG. 8 operates in an identical fashion, providing signals to PLA 29 (line 30 being analogous to line 28), which in turn directs the address circuits of FIGS. 10 and 11 to generate SX and SY addresses. It should be borne in mind, however, that the addresses to provide pixels along vector 74 in FIG. 14 are only incremented when the count circuit of FIG. 5 indicates that a fast vector has been completely drawn. The count circuit of FIG. 5 operates to count, in response to control signals from PLA 31 as described earlier, each time a pixel value, such as pixels 77 and 79, is generated.

Figure 15:
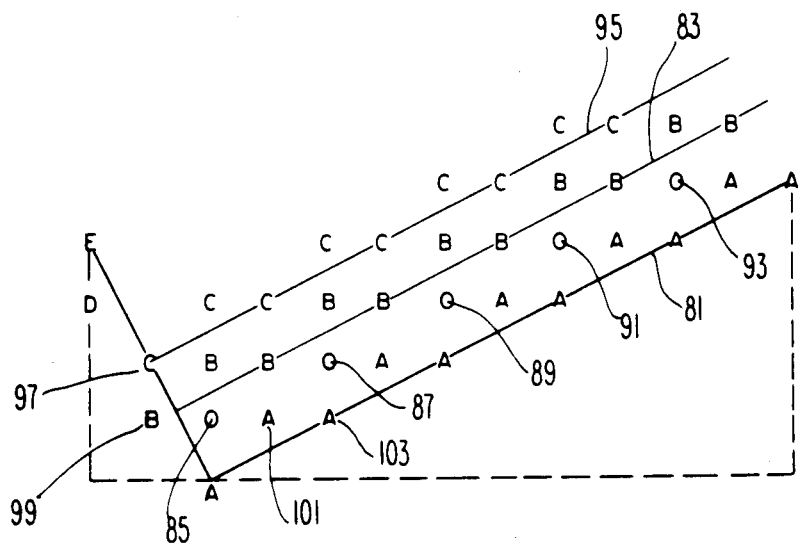
FIG. 15 depicts a rotated image in need of hole fill.

It was mentioned earlier that the present system effects a hole fill. Before discussing the circuitry to effect the hole fill we should consider why it is necessary. Consider FIG. 15. In FIG. 15 there is shown a vector 81 which has the same slope as vector 73 in FIG. 14 but which is twice as long. Letters have been placed at positions corresponding to the centers of pixels and of course the pixel positions of FIG. 15 would be twice as large as the pixel positions of FIG. 14. FIG. 15 is exaggerated to show the arrangement by which holes occur. "A"s depict the centers of pixels forming a vector along line 81. "B"s depict centers of pixels forming a second vector along line 83. Note that at positions 85, 87, 89, 91, and 93 there is neither an A nor a B and hence each position is considered a hole.

Before proceeding further with the discussion of hole fill, it should be recognized that there is a simple test for alerting the system that holes are possible in the destination parallelogram. The system first examines the arithmetic signs of SDX, SDY, FDX and FDY. If there is an odd number of minus signs, then holes are possible. In addition, holes will occur only during the generation of pixel addresses which form the fast vectors when the origin of one fast vector will move diagonally along the slow vector for the next fast vector origin location. Finally, holes occur when the above two conditions are present and the address of a subsequent pixel on a fast vector is located diagonally with respect to the address of a previously generated pixel. The first condition is detected in the state machine 37 and the second and third conditions are detected by the Bresenham Algorithm circuits, which output appropriate signals to the state machine.

It will be recalled that the arithmetic signs of the input signals on lines 24 and 26 in FIG. 1 are directly detected and that those sign signals are stored in flip flops not shown. Those arithmetic sign signals are sent from those flip flops along lines 34 and 36 to an exclusive OR circuit in the state machine 37 and the output signal therefrom is input to a hole test AND gate in the state machine 37. A plus sign signal along line 38 from the slow destination Bresenham Algorithm circuit (flip-flop 8-12) of FIG. 8 indicated that the origin of the next fast vector will be diagonally located with respect to the origin of the previous fast vector, which is the second condition mentioned above to alert for a hole fill. The last mentioned sign signal is output to the hole test AND gate in the state machine 37.

A plus sign signal along line 40 from the Bresenham Algorithm circuitry of FIG. 4 would indicate that the address of a subsequent pixel on a fast vector will be located diagonally with respect to a previously generated pixel address, which is the third condition mentioned above to alert the system to a hole fill. The sign signal from the circuitry of FIG. 4 is output to the hole test AND gate in the state machine 37. It is apparent from a consideration of FIG. 15 that all three conditions are present for generating holes during generation of the A pixels. Before proceeding with the description of how the holes are filled it should be noted that there are no holes generated when the B pixels are computed. During the computing of the B pixels the first and third conditions mentioned above are present but the second condition, i.e. that the origin of the next fast vector be located diagonally with respect to the previous fast vector origin, is not present. The origin 97 of vector C is not located diagonally with respect to the origin 99 of vector 8.

Since, with respect to the generation of the A pixels in FIG. 15 the three alert conditions exist, state machine 37 sends an instruction signal to PLA 31 which in turn enables the circuitry of FIGS. 5, 6 and 7. The instruction signal from PLA 31 sets switch 7-3 to "0" input line 7-4 and sets switch 6-3 to its "1" input line 6-12 so that only the Y axis address will be incremented. In addition, the switch 5-4 is set to the "0" input line 5-11 so that the pixel value added at location 85 will not be counted. The switches 4-1, 4-3 and 4-5 of the Bresenham Algorithm circuit in FIG. 4 will be set to their "0" inputs to prevent a new instruction during the time slot in which the pixel value in location 85 is generated. In the next time slot the state machine 37 instructs the PLA 31 to set switch 7-3 to the "1" input line 7-12; switch 6-4 to the "0" line 6-4; the switch 5-4 to its "1" input line 5-5; and the switches 4-1, 4-3 and 4-5 respectively to the accumulator input line 4-14, the FDX input line 4-7 and the PDY input line 4-9. Hence only the address along the X axis is incremented and the next FX address is where the A pixel value 101 is located. The pixel value at location 101 will be counted and the Bresenham Algorithm circuit will generate new instructions for incrementing the address to generate the A pixel 103.

We claim:

1. A transformation circuit for reading a first plurality of pixel values corresponding to a source image from a first array of addresses in a bit map memory having rows and columns of addresses and writing a second plurality of pixel values corresponding to a transformed version of the source image into a second array of addresses in the bit map memory, each address consisting of an X address component identifying a column in the bit map memory and a Y address component identifying a row, the source image being formed by a plurality of parallel source fast vectors originating along a source slow vector perpendicular thereto, and the transformed image being formed by a plurality of destination fast vectors originating along a destination slow vector, each destination fast vector being a transformation of a corresponding source fast vector and the destination slow vector being a transformation of the source slow vector, each vector comprising pixel values stored at a sequence of addresses, an address circuit being connected to the bit map memory, the address circuit accessing a selected address in the bit map memory in response to address signals, wherein the transformation circuit comprises the following:

(a) slow vector destination address circuitry (13) for outputting a sequence of addresses at which the pixel values representing the destination slow vector are to be stored as a function of the X and Y components of the first address and the X and Y extents of the destination slow vector;

(b) fast vector destination address circuitry (15) connected to the slow vector destination address circuitry for outputting a sequence of addresses at which the pixel values representing a destination fast vector are to be stored as a function of the address output by the slow vector destination address circuitry and the X and Y extents of a destination fast vector;

(c) source logic circuitry (55) for outputting the first array of addresses in sequence;

(d) switching circuitry (29, 31, 53) connected to the slow vector destination address circuitry, the fast vector destination address circuitry and the source logic circuitry for outputting switching signals for determining the sequence of addresses output by the slow vector destination address circuitry, the fast vector destination address circuitry and the source logic circuitry respectively;

(e) control circuitry (37) connected to the switching circuitry, the slow vector destination address circuitry and the fast vector destination address circuitry for outputting contol signals to the switching circuitry in response to status signals from the destination address circuitry; and (f) address collection circuitry (50) connected to the source logic circuitry (55), the fast vector destination address circuitry (15) and the address circuit (59) for multiplexing the addresses output by the source logic circuitry and the fast vector destination address circuitry to the address circuit (59).

2. The transformation circuit as defined in claim 1, wherein the fast vector destination address circuitry includes counting circuitry for updating a count by one in response to the generation of an X address for a pixel value of a destination fast vector which is different than the X address generated for the previous pixel value of that destination fast vector and for outputting a status signal to the control circuitry indicating the end of the destination fast vector in response to the number of updates attaining a value equal to the X extent of the fast vector.

3. The transformation circuit as defined in claim 2, wherein the slow vector destination address circuitry includes counting circuitry for updating a count by one in response to the generation of a Y address for a pixel value of the destination slow vector which is different than the Y address generated for the previous pixel value of the destination slow vector and for outputting a status signal to the control circuitry indicating the end of the destination slow vector in response to the number of updates attaining a value equal to the Y extent of the slow vector.

4. The transformation circuit as defined in claim 1, wherein the slow vector destination address circuitry further includes rotation determination circuitry connected to receive the X and Y extents of the destination slow vector and connected to output either of first and second status signals to the switching circuitry as a function of the result of processing the X and Y extents of the destination slow vector in accordance with a predetermined algorithm, the switching circuitry switching the slow vector destination address circuitry to generate a sequence of addresses which substantially lie along a vector which is rotated relative to the source slow vector.

5. The transformation circuit as defined in claim 4, wherein the slow vector destination address circuitry further includes X address determination circuitry and Y address determination circuitry respectively connected to receive the X and Y components of the first address and both connected to receive switching signals from the switching circuitry, said X and Y address determination circuitry respectively generating the X and Y components of a sequence of addresses in the bit map memory at which the pixel values representing the destination slow vector are to be stored, the switching circuitry switching the X address determination circuitry to generate an unchanged X component and switching the Y address determination circuitry to generate an updated Y component in response to the first status signal and switching the X and Y address determination circuitry to respectively generate updated X and Y components in response to the second status signal.

6. The transformation circuit as defined in claim 4, wherein the predetermined algorithm is the Bresenham algorithm.

7. The transformation circuit as defined in claim 1, wherein the fast vector destination address circuitry further includes rotation determination circuitry connected to receive the X and Y extents of a destination fast vector and connected to output either of first and second status signals to the switching circuitry as a function of the result of processing the X and Y extents of a destination fast vector in accordance with a predetermined algorithm, the switching circuitry switching the fast vector destination address circuitry to generate a sequence of addresses which substantially lie along a vector which is rotated relative to the source fast vectors.

8. The transformation circuit as defined in claim 7, wherein the fast vector destination address circuitry further includes X address determination circuitry and Y address determination circuitry respectively connected to receive the X and Y components output by the slow vector destination address circuitry and both connected to receive switching signals from the switching circuitry, the X and Y address determination circuitry respectively generating the X and Y components of a sequence of addresses in the bit map memory at which the pixel values representing a destination fast vector are to be stored, the switching circuitry switching the X address determination circuitry to generate an updated X component and switching the Y address determination circuitry to generate an unchanged Y component in response to the first status signal and switching the X and Y address determination circuitry to respectively generate updated X and Y components in response to the second status signal.

9. The transformation circuit as defined in claim 8, wherein the control circuitry (37) outputs a predetermined control signal to the switching circuitry in response to the receipt of a predetermined set of status signals from the destination address circuitry (13, 15) representing the presence of a hole in the sequence of addresses at which the pixel values representing the transformed image are to be stored, and the switching circuitry (31) switches the X address determination circuitry to generate an unchanged X component and switches the Y address determination circuitry to generate an updated Y component in response to the predetermined control signal.

10. The transformation circuit as defined in claim 7, wherein the predetermined algorithm is the Bresenham algorithm.

11. The transformation circuit as defined in claim 1, wherein the transformation circuit further comprises scale circuitry (41, 43) connected to receive scale factor signals from and to send status signals to the control circuitry (37), the control circuitry controlling the switching circuitry in response to the status signals received from the scale circuit, such that the number of second array addresses generated for each of at least some of the first array addresses is not equal to one, the number of second array addresses generated for each of the first array addresses being dependent on the scale factor received from the control circuit.

12. The transformation circuit as defined in claim 11, wherein the control circuitry (37) controls the switching circuitry (53) in response to a predetermined status signal from the scale circuitry (41, 43) such that the next first array address is output by the source logic circuitry (55).

13. The transformation circuit as defined in claim 11, wherein the scaling factor has a value such that the transformed image is larger than the source image.

14. The transformation circuit as defined in claim 13, wherein the transformed image is greater than the source image by a fractional multiple.

15. The transformation circuit as defined in claim 11, wherein the scaling factor has a value such that the transformed image is smaller than the source image.

16. The transformation circuit as defined in claim 15, wherein the transformed image is smaller than the source image by a fractional multiple.

* * * * *